United States Patent [19]

Settles

[11] Patent Number: 4,899,863

[45] Date of Patent: * Feb. 13, 1990

[54] METHOD OF MAKING A SHAFT FOR A CLUTCH FOR A COOLING FAN OF A MOTOR VEHICLE

[75] Inventor: David J. Settles, Ft. Worth, Tex.

[73] Assignee: Dayco Products-Eaglemotive, Inc., Fort Worth, Tex.

[*] Notice: The portion of the term of this patent subsequent to May 3, 2005 has been disclaimed.

[21] Appl. No.: 260,627

[22] Filed: Oct. 21, 1988

Related U.S. Application Data

[62] Division of Ser. No. 158,413, Feb. 22, 1988, abandoned, which is a division of Ser. No. 895,976, Aug. 12, 1986, Pat. No. 4,741,091.

[51] Int. Cl.⁴ ............................................. F16D 35/00
[52] U.S. Cl. ............................. 192/110 R; 192/58 B; 29/DIG. 23; 384/477
[58] Field of Search ................ 192/58 R, 58 A, 58 B, 192/110 R, 115; 29/525, DIG. 23; 403/273, 282, 359, 360; 384/477, 537, 585

[56] References Cited

U.S. PATENT DOCUMENTS

| | | | |
|---|---|---|---|
| 3,133,344 | 5/1964 | Keasler | 29/525 X |
| 3,363,734 | 1/1968 | Sabat | 192/58 B |
| 3,419,122 | 12/1968 | Connelly | 192/58 B |
| 3,451,736 | 6/1969 | Riccio | 384/537 |
| 3,575,269 | 4/1971 | Sherman | 192/58 R |
| 3,613,847 | 10/1971 | Masai | 192/58 B |
| 3,962,772 | 6/1976 | Haller | 29/DIG. 23 X |
| 4,056,178 | 11/1977 | Detty | 192/58 B |
| 4,257,501 | 3/1981 | Woods | 192/58 C |
| 4,312,433 | 1/1982 | Bopp | 192/58 B |
| 4,741,091 | 5/1988 | Settles | 29/525 |

OTHER PUBLICATIONS

Abandoned Ser. No. 490,798 filed May 2, 1983.

Primary Examiner—Rodney H. Bonck
Assistant Examiner—Richard M. Lorence
Attorney, Agent, or Firm—Joseph V. Tassone

[57] ABSTRACT

A clutch for a cooling fan for a motor vehicle and method of making the same are provided, the clutch comprising a shaft having a knurled portion that press-fittingly receives an inner race member of a bearing, the shaft having a solid ring shaped portion disposed adjacent the knurled portion and being provided with an outer diameter about equal to that of the outer diameter of the knurled portion and having part of the inner race member of the bearing press-fitted thereon whereby the solid ring shaped portion is adapted to block the flow of viscous fluid out of an enclosed chamber of a housing of the clutch by way of the slots which define protuberances of the knurled portion.

4 Claims, 1 Drawing Sheet

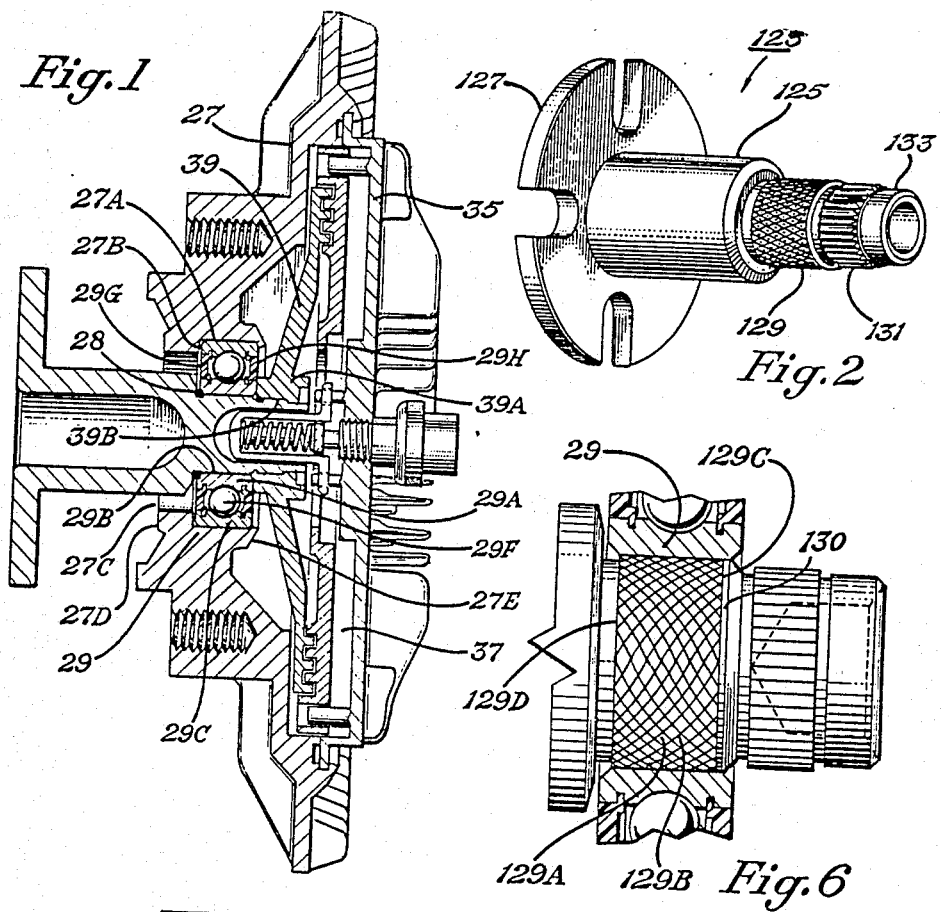

METHOD OF MAKING A SHAFT FOR A CLUTCH FOR A COOLING FAN OF A MOTOR VEHICLE

This application is a divisional patent application of its copending parent patent application, Ser. No. 158,413, filed Feb. 22, 1988, now abandoned, which, in turn, is a divisional patent application of its copending parent patent application, Ser. No. 895,976, filed Aug. 12, 1986, now U.S. Pat. No. 4,741,091.

BACKGROUND OF THE INVENTION

1. Field of the Invention

This invention relates to a new clutch for a cooling fan of a motor vehicle and to a method of making such a clutch.

2. Prior Art Statement

It is known to applicant to provide a clutch for a cooling fan of a motor vehicle wherein the clutch comprises a shaft having a first end to be attached to a rotatable member of the motor vehicle and having a second end defined by a cylindrically shaped knurled portion and an adjacent second portion, the knurled portion having protuberances defined by slots formed in the exterior of the shaft, the knurled portion having an outer diameter and having an inner edge adjacent the second portion and an outer edge adjacent the first end, a bearing means having an inner race member press-fitted onto the knurled portion, a housing comprising a body member and a plate member secured together to form an enclosed chamber for holding a viscous fluid, the housing having means for mounting a fan, the body member having a central opening defined by structural means, the bearing means being disposed in the central opening of the body member and engaging the structural means such that the bearing means supports the body member and hence the housing for rotation, and a drive plate having a central opening defined by inner structure press-fitted onto the second portion of the shaft. For example, see the abandoned U.S. patent application, Ser. No. 490,798, filed May 2, 1983.

Also see U.S. Pat. Nos. 3,575,269 and 4,257,501 which disclose two different types of fan clutches for motor vehicles such as automobiles or trucks. In both types of fan clutches, a housing is formed by a body member and a plate member secured together to form an enclosed chamber for holding a viscous fluid. A shaft is provided for coupling the fan clutch to the engine of the vehicle. The shaft has a smooth surface at one end for rotatably supporting the drive plate of the fan clutch. The bearing is press-fitted onto the end of the shaft and supports the body member and hence the housing for rotation. The drive plate, located in the chamber, also is press-fitted onto the end of the shaft.

SUMMARY OF THE INVENTION

It is one feature of this invention to provide a new clutch for a cooling fan of a motor vehicle or the like wherein viscous fluid is not adapted to flow out of the enclosed chamber thereof by way of the slots which define the protuberances of the knurled portion of the shaft of the clutch.

In particular, it was found according to the teachings of this invention that a solid ring shaped portion can be formed adjacent the inner edge of the knurled portion of the shaft, have a diameter about equal to that of the outer diameter of the knurled portion and have part of the inner race member of the bearing means press-fitted thereon whereby the solid ring shaped portion is adapted to block the flow of the viscous fluid out of the enclosed chamber by way of the slots which define the protuberances of the knurled portion.

For example, one embodiment of this invention provides a clutch for a cooling fan of a motor vehicle, the clutch comprising a shaft having a first end to be attached to a rotatable member of the motor vehicle and having a second end defined by a cylindrically shaped knurled portion and an adjacent second portion, the knurled portion having protuberances defined by slots formed in the exterior of the shaft, the knurled portion having an outer diameter and having an inner edge adjacent the second portion and an outer edge adjacent the first end, a bearing means having an inner race member press-fitted onto the knurled portion, a housing comprising a body member and a plate member secured together to form an enclosed chamber for holding a viscous fluid, the housing having means for mounting a fan, the body member having a central opening defined by structural means, the bearing means being disposed in the central opening of the body member and engaging the structural means such that the bearing means supports the body member and hence the housing for rotation, and a drive plate having a central opening defined by inner structure press-fitted onto the second portion of the shaft, the shaft having a solid ring shaped portion formed between the knurled portion and the second portion and next to the inner edge of the knurled portion, the solid ring shaped portion having an outer diameter about equal to that of the outer diameter of the knurled portion and having part of the inner race member of the bearing means pressfitted thereon whereby the solid ring shaped portion is adapted to block the flow of the viscous fluid out of the enclosed chamber by way of the slots which define the protuberances of the knurled portion.

Accordingly, it is an object of this invention to provide a new clutch for a cooling fan of a motor vehicle, the clutch of this invention having one or more of the novel features set forth above or hereinafter shown or described.

Another object of this invention is to provide a new method of making a clutch for a cooling fan of a motor vehicle, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a cross section of a fan clutch employing the shaft of the invention.

FIG. 2 is a perspective view of the shaft used in the fan clutch of FIG. 1

FIG. 3 is a partial cross section of the end of the shaft of FIG. 2 before the knurled portion and before the splined portion are formed.

FIG. 4 is a partial cross section of the end of the shaft of FIG. 3 after the knurled portion and the splined portion are formed but before the knurled portion and the solid sealing ring are burnished.

FIG. 5 is a partial cross section of the end of the shaft of FIG. 4 after the knurled portion and the solid ring have been burnished.

FIG. 6 is a partial side view of the shaft of the invention.

DESCRIPTION OF THE PREFERRED EMBODIMENT

Referring now to FIG. 1 of the drawings, there is illustrated a cross section of a fan clutch 21 of the type disclosed in U. S. Pat. No. 4,257,501. The fan clutch is supported by the shaft 123 of FIGS. 2, 5 and 6. It is to be understood that the shaft of FIGS. 2, 5, and 6, could be employed to support other types of fan clutches, for example of the type disclosed in U. S. Pat. No. 3,575,269. The fan clutch of FIG. 1 comprises a housing formed by a body member 27 having a plate 35 secured thereto for forming a sealed chamber 37 for holding a viscous fluid such as a silicone fluid. An annular bearing 29 having a steel inner race member 29A with a central opening 29B is mounted onto the shaft 123 and supports the member 27 and hence the housing for rotation. Also fixedly mounted on the shaft 123 is an aluminum drive plate 39 having an inner rim 39A with a central opening 39B.

Referring to FIGS. 2, 5 and 6, the shaft 123 comprises a shank 125 having a flange 127 attached (welded) to one end for mounting the shaft to the water pump of the engine for rotation therewith. The other end of the shank 125 has a knurled portion 129 for supporting the bearing 29 and a splined portion 131 for supporting the drive plate 39. The knurled portion 129 comprises diamond shaped protuberances 129A defined by slots 129B. The slots 129B cross each other and extend from the inner edge 129C of the knurled portion to its outer edge 129D. Formed next to the inner edge 129C of the knurled portion 129 is a solid sealing ring 130 which extends around the shaft. The ring 130 has an outer diameter equal to that of the knurled portion 129. The splined portion 131 comprises ridges extending parallel to the axis of the shaft. The diameter of the splined portion 131 is smaller than the diameter of the knurled portion 129. The end 133 of the shaft 123 is smooth. The shaft 123 is formed from cold drawn steel in bar form in a bar feed screw machine. The screw machine cuts the shaft to shape and forms the knurled portion 129 and the splined portion 131. Referring to FIGS. 3–5, the screw machine forms shaft portions 129' and 131' of different diameters at the end of the shank with the sealing ring 130 formed near the end of shaft portion 129'. From the portions 129' and 131', the screw machine forms the knurled portion 129 and the splined portion 131 respectively.

The knurling and spline forming operations raises the metal radially outward beyond the diameter of portions 129' and 131'. At this stage of the process the ring 130 has a slightly smaller diameter than that of the knurled portion 129. The knurled portion 129 and ring 130 are burnished with rollers in a burnishing machine in order to make the knurled portion 129 exactly round and to insure that it has the desired diameter. It is easier to burnish the crests of the knurled portion 129 than the solid ring 130. After burnishing, however, the diameter of the ring 130 is equal to the diameter of the knurled portion 129. This occurs since the solid ring 130 is at the end of the knurled portion 129 and receives a greater amount of burnishing, than it would if it were at the center of the knurled portion, as the knurled portion is fed into and out of the burnishing machine. The inner race member 29A of the bearing 29 is press-fitted onto the knurled portion 129 and ring 130 of the shaft 123 and the inner rim 39A of the drive plate 39 is press-fitted onto the splined portion 131. The splined portion 131 has a smaller diameter than that of the knurled portion 129 to provide sufficient clearance in order to allow the splined portion 131 to pass through the central opening 29B of the inner race member 29A of the bearing 29.

The burnished, knurled portion 129 provides a substantially perfectly round, but rough, and relatively large surface area which allows the inner race 29A of the bearing 29 to be press-fitted without distortion and which securely holds the bearing 29 once it has been press-fitted in place. When the drive plate 39 is press-fitted onto the splined portion 131 of the shaft 123, the splines or ridges bite or gouge into the relatively soft inner surface of the aluminum rim 39A thereby providing an increased surface area contact between the splines and the rim which results in better attachment of the drive plate to the shaft than occurs in a press-fit onto a smooth surface. The solid sealing ring 130 blocks the flow of the viscous fluid out of the chamber 37 by way of the slots 129B of the knurled portion 129. Since the ring 130 has the same diameter as that of the knurled portion 129, it does not weaken the bearing 29.

In one embodiment, the knurled portion 129 is a standard 25 pitch diamond knurl. The blank portion 129' has a diameter of 0.6625 –0.6655 of an inch. After knurling and before burnishing, the crest diameter of the knurled portion is 0.675 –0.683 of an inch. Prior to burnishing, the ring 130 has a diameter of 0.674 –0.676 of an inch and has a width of 1/32 of an inch. It is spaced 0.015 of an inch from the edge 132. After burnishing, the knurled portion 129 and ring 130 have the same diameter which is equal to 0.6700 –0.6705 of an inch. The diameter of portion 133 is 0.622 –0.624 of an inch. The splined portion 131 has an outside diameter of 0.640 –0.660 of an inch. The rim 39A of plate 39 has an inside diameter of 0.623 –0.627 of an inch.

The outer race member 29C of the bearing 29 engages the surface 27A and the shoulder 27B of the opening 27C formed through the inner rim 27D of the body member 27 and the lip 27E is swedged over the outer race 29C to secure the body member 27 to the bearing. The balls of the bearing 29 are illustrated at 29F. The bearing 29 has seals 29G and 29H at opposite ends. A resilient sealing member 28 is located between the outer edge 129D of the knurled portion 129 and the enlarged portion of the shank 125. In FIG. 6 the sealing member 28 is not shown. Although not shown, the end portion 133 of the shaft is staked against the rim 39A of the drive plate 39.

The other components of the fan clutch of FIG. 1 are fully disclosed in U.S. Pat. No. 4,257,501 and this patent is incorporated herein by this reference thereto.

Thus, it can be seen that this invention provides a new clutch for a cooling fan for a motor vehicle and a new method of making such a clutch.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a shaft for a clutch for a cooling fan of a motor vehicle, said shaft having a first end to be attached to a rotatable member of the motor vehicle and having a second end defined by a cylindrically shaped knurled portion and an adjacent second portion, said knurled portion having protuberances defined by slots formed in the exterior of said shaft, said knurled portion having an outer diameter and having an inner edge adjacent said second portion and an outer edge adjacent said first end whereby a bearing means having an inner race member is adapted to be press-fitted onto said knurled portion, the improvement comprising the step of forming said shaft before using said shaft to form said clutch with a solid ring shaped portion between said knurled portion and said second portion and next to said inner edge of said knurled portion and with said solid ring shaped portion having an outer diameter about equal to that of said outer diameter of said knurled portion so as to have part of said inner race member of said bearing means be adapted to be press-fitted thereon whereby said solid ring shaped portion is adapted to block the flow of viscous fluid by way of said slots which define said protuberances of said knurled portion, said step of forming said shaft comprising the steps of first forming said knurled portion with said protuberances so that said knurled portion has a diameter larger than said solid ring shaped portion and then burnishing said protuberances and said solid ring shaped portion to about the same diameter, so that then said bearing means can be press-fitted on said knurled portion of said shaft so that said part of said inner race member of said bearing means can remain press-fitted on said solid ring shaped portion.

2. A method of making shaft as set forth in claim 1 wherein said step of forming said shaft includes the step of forming said second portion of said shaft to have splines in the exterior thereof.

3. A method of making a shaft as set forth in claim 1 wherein said step of forming said shaft includes the step of forming said slots in said knurled portion so as to extend from said inner edge thereof to said outer edge thereof.

4. A method of making a shaft as set forth in claim 3 wherein said step of forming said shaft includes the step of forming said protuberances of said knurled portion to be diamond shaped by causing said slots to cross each other.

* * * * *